US006126267A

United States Patent [19]
Ito et al.

[11] Patent Number: 6,126,267
[45] Date of Patent: Oct. 3, 2000

[54] INK-JET PRINTER

[75] Inventors: Takuro Ito; Akira Sato; Yoshihide Akuzawa, all of Shizuoka-ken, Japan

[73] Assignee: Toshiba Tec Kabushiki Kaisha, Tokyo, Japan

[21] Appl. No.: 09/153,839

[22] Filed: Sep. 15, 1998

[30] Foreign Application Priority Data

Sep. 19, 1997 [JP] Japan .................................... 9-255706

[51] Int. Cl.[7] .................................................... G01D 15/16
[52] U.S. Cl. ................................................................ 347/35
[58] Field of Search ................................. 347/85, 84, 89, 347/104, 36, 6, 5, 90, 35, 30, 42, 25

[56] References Cited

U.S. PATENT DOCUMENTS

| | | | |
|---|---|---|---|
| 4,413,267 | 11/1983 | Hein | 346/75 |
| 4,432,003 | 2/1984 | Barbero et al. | 347/55 |
| 4,631,556 | 12/1986 | Watanabe et al. | 346/75 |
| 5,159,348 | 10/1992 | Dietl et al. | 347/85 |
| 5,495,877 | 3/1996 | Schwenk et al. | 347/85 |

FOREIGN PATENT DOCUMENTS

| | | | |
|---|---|---|---|
| 0 575 983 | 12/1993 | European Pat. Off. . | |
| 594124 | 4/1994 | European Pat. Off. | 347/87 |
| 4-6551 | 2/1992 | Japan . | |
| WO 93/17867 | 9/1993 | WIPO . | |

OTHER PUBLICATIONS

Patent Abstracts Of Japan, vol. 095, No. 002, Mar. 31, 1995, Abstract of JP 06 316086 A, Nov. 15, 1994.

Patent Abstracts Of Japan, vol. 098, No. 001, Jan. 30, 1998, Abstract of JP 09 234886 A, Sep. 9, 1997.

*Primary Examiner*—N. Le
*Assistant Examiner*—Lamson D. Nguyen
*Attorney, Agent, or Firm*—Frishauf, Holtz, Goodman, Langer & Chick, P.C.

[57] ABSTRACT

An ink-jet printer comprises a print head for ejecting ink, an ink tank for storing ink to be ejected from the print head, a piping member connected between the ink tank and the print head, a pump mechanism interposed in the piping member to supply ink from the ink tank to the print head, and a control unit for controlling the print head and the pump mechanism to print an image by ejecting ink. In particular, the control unit is constructed to perform a pump drive processing for driving the pump mechanism to discharge all of ink stored in the ink tank in a displacement mode.

9 Claims, 3 Drawing Sheets

INK-JET PRINTER

BACKGROUND OF THE INVENTION

The present invention relates to an ink-jet printer which prints an image onto a print medium held on a rotary drum with ink ejected from a print head, and particularly, to an ink-jet printer in which ink is supplied from an ink tank apart from the print head.

Conventionally, serial-type color ink-jet printers are widely spreading. In the serial-type ink-jet printer, a plurality of print heads and ink tanks of a relatively small capacity are integrally mounted on a carriage, and the carriage is movably attached to a guide bar extending across a paper sheet. The paper sheet is fed in a direction perpendicular to the guide bar at a constant pitch, and the carriage is moved along the guide bar each time the paper sheet is fed for one pitch. During the movement of the carriage, the print heads eject inks of different colors respectively supplied from the ink tanks In the structure as described above, for example, a color image of A4 size is printed out in ten minutes. Thus, the serial-type ink-jet printer operates at a slow print speed of 0.1 sheet per minute.

In recent years, a drum rotation type ink-jet printer capable of printing a color image at a higher speed has been suggested. This ink-jet printer includes a rotary drum rotating in one direction and a print head disposed to face a paper sheet held on the rotary drum. The print head has a plurality of nozzle units which are arranged along the peripheral surface of the rotary drum and eject inks of different colors onto the paper sheet rotating together with the rotary drum. Each nozzle unit has a plurality of ink-jet nozzles disposed across the paper sheet in the axial direction of the rotary drum. The color image is printed with inks ejected from nozzle units. In this structure, for example, a color image of A4 size can be printed out in about two or three seconds.

In this drum-rotation type ink-jet printer, a plurality of ink tanks are placed apart from the print head to store inks of different colors to be supplied to the nozzle units of the print head. Each ink tank is connected to a corresponding nozzle unit via a supply tube, and are filled with ink supplied from an ink reserve bottle detachably attached thereto. Ink is fed to an ink pressure chamber of the nozzle unit by a supply pump having a valve function and interposed in the supply tube. At the time of printing, the supply pump is stopped in a valve-open state, and the nozzle unit is driven to eject ink. Upon consumption of ink for ejection, an amount of ink consumed in the ink pressure chamber is supplemented through the supply tube by capillary phenomenon.

However, the drum-rotation type ink-jet printer has a problem that leakage of ink is caused by impacts and vibrations applied from a transporter vehicle or the like. The ink leakage occurs when the supply tube comes off from the ink tank or when the ink reserve bottle tilts with respect to the ink tank.

BRIEF SUMMARY OF THE INVENTION

An object of the present invention is to provide an ink-jet printer which can prevent leakage of ink caused by impacts and vibrations applied during transportation, without requiring an increase of the hardware resources.

According to the present invention, there is provided an ink-jet printer which comprises: a print head for ejecting ink; an ink tank for storing ink to be ejected by the print head; a piping member connected between the ink tank and the print head; a pump mechanism interposed in the piping member to supply ink from the ink tank to the print head; and a control unit for controlling the print head and the pump mechanism to print an image by ejecting ink, wherein the control unit is constructed to perform a pump drive processing for driving the pump mechanism to discharge all of ink stored in the ink tank in a displacement mode.

In the ink-jet printer, the control unit performs a pump drive processing in the displacement mode, and the pump mechanism discharges all of ink remaining in the ink tank by the pump drive processing. The ink-jet printer is therefore transported with the ink tank kept empty. Accordingly, leakage of ink is not caused even if a piping member falls off due to impacts or vibrations applied during transportation. In addition, since such a pump drive processing is easily attainable, for example, by modifying the existing configuration of the control unit, a substantial increase of hardware resources can be avoided in the ink-jet printer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An ink-jet printer according to an embodiment of the present invention will be described with reference to FIGS. 1 to 5.

Figure 1:
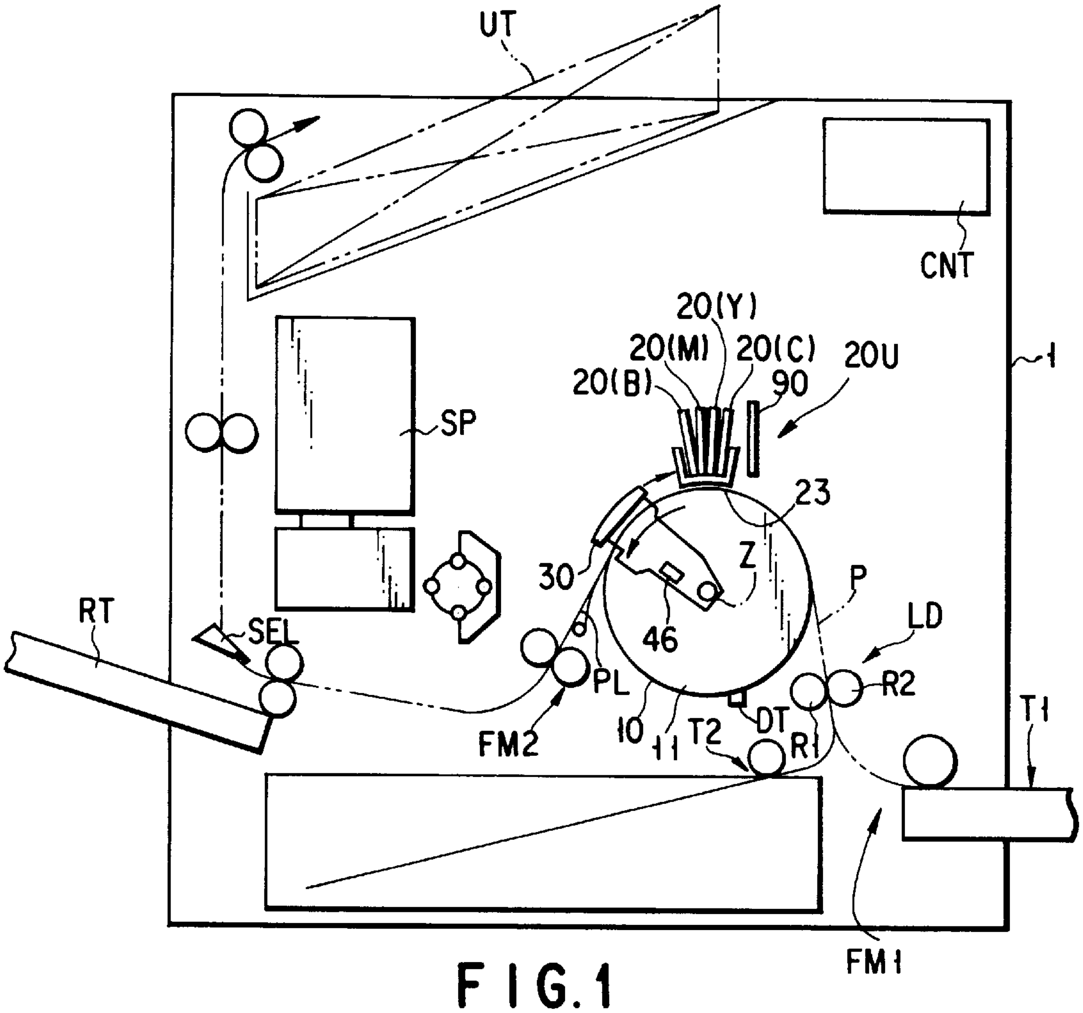
FIG. 1 is a view showing an internal structure of an ink-jet printer according to an embodiment of the present invention.
Figure 2:
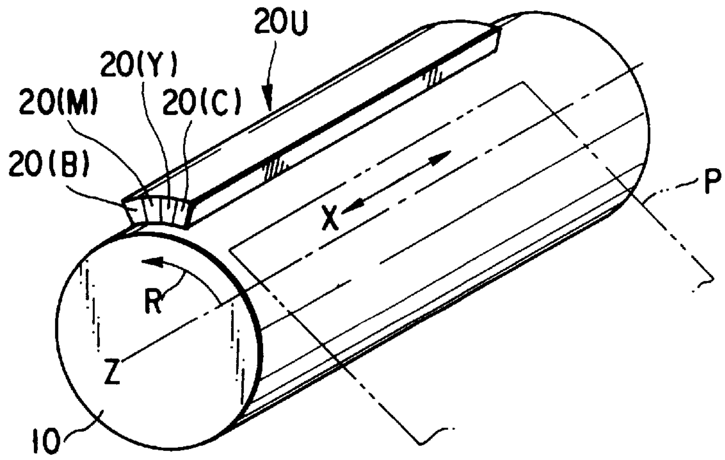
FIG. 2 is a perspective view showing a positional relationship between the rotary drum and the print head shown in FIG. 1.

FIG. 1 shows the internal structure of the ink-jet printer. The ink-jet printer is used to perform a multicolor printing on a paper sheet P cut as a printing medium. The paper sheet P may be a plain paper or OHP sheet.

The ink-jet printer comprises a rotary drum 10, a print head 20U, a manual-feed tray T1, a paper cassette T2, sheet feed-in mechanism FM1, a sheet feed-out mechanism FM2, and a control unit CNT. The rotary drum 10 rotates at a predetermined circumferential speed, with a paper sheet P held thereon. The print head 20U performs a multicolor printing on the paper sheet P rotating along with the rotary drum 10. The manual-feed tray T1 places each of paper sheets P to be fed one by one. The paper cassette T2 contains a stack of paper sheets P. The sheet feed-in mechanism FM1 feeds each paper sheet P from the paper cassette T2 and the manual-feed tray T1 into the rotary drum 10. The sheet feed-out mechanism FM2 feeds out the paper sheet P printed at the rotary drum 10. The control unit CNT controls the overall operation made by the components of the ink jet printer. As shown in FIG. 1, the rotary drum 10 is located near the central position within a housing 1. The manual-feed tray T1 is located below the rotary drum 10 and extends externally from a front surface of the housing 1, and the paper cassette T2 is located under the manual-feed tray 10. The sheet feed-in mechanism FM1 is placed between the manual-feed tray T1 and the paper cassette T2. The print head 20U is located above the rotary drum 10. The sheet feedout mechanism FM2 is located on a side of the rotary drum 10 which is opposite to the sheet feed-in mechanism FM1.

The rotary drum 10 is supported to be rotatable about the axis Z and causes the paper sheet P to be wound around and held on a peripheral surface 11 thereof in accordance with its rotation. The rotational position of the rotary drum 10 is detected by a rotational position detector DT disposed near the peripheral surface 11 of the rotary drum 10. The print head 20U includes four nozzle units 20 (C, Y, M, and B) which are arranged in order along the peripheral surface 11 of the rotary drum 10 from the upstream side to the downstream side so as to perform a printing on the paper sheet P with inks of cyan (C), yellow (Y), magenta (M), and black (B). The nozzles units 20 (C, Y, M, and B) receive inks of corresponding colors from an ink supply system SP. Each of the nozzle units 20 (C, Y, M, and B) has a plurality of ink-jet nozzles 23 which are arranged in the axial direction of the rotary drum 10 to have a span corresponding to the width of the paper sheet P of A4 size and eject the corresponding color ink to the paper sheet P. Specifically, the nozzle units 20 (C, Y, M, and B) are constructed in structures identical to each other. Each of the nozzle unit 20 (C, Y, M, and B) has four nozzle segments 20A to 20D arrayed in a zigzag form on a connection plate (not shown) extending in the axial direction X of the rotary drum 10 which coincides with the widthwise direction of the paper sheet P. The nozzle segments 20A and 20C are mounted on a first surface of the connection plate, and the nozzle segments 20B and 20C are mounted on a second surface of the connection plate opposed to the first surface. The top ends of the inkjet nozzles 23 of the nozzle segments 20A to 20D are aligned with a height equal to the top end surface 24 of the print head 20U. Each of the nozzle segments 20A to 20D is constituted by a predetermined number of inkjet nozzles 23 and an ink pressure chamber 22 for directly applying ink to the ink-jet nozzles 23. The ink pressure chambers 22 of the nozzle segments 20A to 20D are connected in series such that ink flows therethrough. The pitch PT of the ink-jet nozzles 23 is set to 1/150, for example, in the case where the printing resolution is 300 dpi in the main scanning direction X.

The sheet feed-in mechanism FM1 has a sheet loader LD for loading the paper sheet P to the rotary drum 10 such that the width direction of the paper sheet P coincides with the axial direction of the rotary drum 10. The paper sheet P is taken out of either the manual-feed tray T1 or the paper cassette T2, and then fed to the sheet loader LD. The paper loader LD is controlled to load the paper sheet P toward the rotary drum 10 when the position detector DT detects that the rotary drum 10 has been rotated to a predetermined position. The print head 20U prints a color image on the paper sheet P as the rotary drum 10 rotates.

The paper sheet P is removed from the peripheral surface 11 of the rotary drum 10 by a sheet separator PL and fed in a predetermined direction by the sheet feed-out mechanism FM2. The paper separator PL is a separation claw which is brought into contact with the rotary drum 10 at the time of sheet removal. A discharge switch SEL guides the paper sheet P to a selected one of a rear discharge tray RT and an upper discharge tray UT. The rear discharge tray RT discharges the paper sheet P with the print surface facing upward, and the upper discharge tray UT discharges the paper sheet P with the print surface facing downward.

The print head 20U is capable of being reciprocally shifted by 1/75 inch in the main scanning direction X parallel to the axial direction of the rotary drum 10. The rotary drum 10 holds the paper sheet P wound around the peripheral surface 11 thereof, and rotates to move the paper sheet P in a sub-scanning direction Y perpendicular to the main scanning direction X, with the paper sheet P opposing to the nozzle units 20 (C, Y, M, and B). The rotary drum is maintained to be a constant rotation rate of 120 rpm and makes one rotation every 0.5 second, for example. In the printing operation, the print head 20U is shifted in the main scanning direction X at a constant rate of ½ nozzle pitch PT each time the rotary drum 10 makes one rotation, so that it moves for a distance equal to the nozzle pitch PT while the rotary drum 10 makes two rotations.

The paper loader LD includes at least a pair of loading rollers R1 and R2 extending in the axial direction of the drum to load the paper sheet P fed from the manual-feed tray T1 or paper cassette T2 to the rotary drum 10 at a predetermined timing. The feed speed of the paper sheet P is set at a value corresponding to the circumferential speed of the rotary drum 10. Since the diameter of the rotary drum 10 is 130 mm, a circumferential speed of 816 mm/sec can be obtained. The peripheral surface 11 of the rotary drum 10 is about 220 mm wide in the axial direction and 408 mm long in the rotational direction. Therefore, the rotary drum 10 can fully hold the A4 size paper sheet P having a length of 297 mm and a width of 210 mm.

Figure 3:
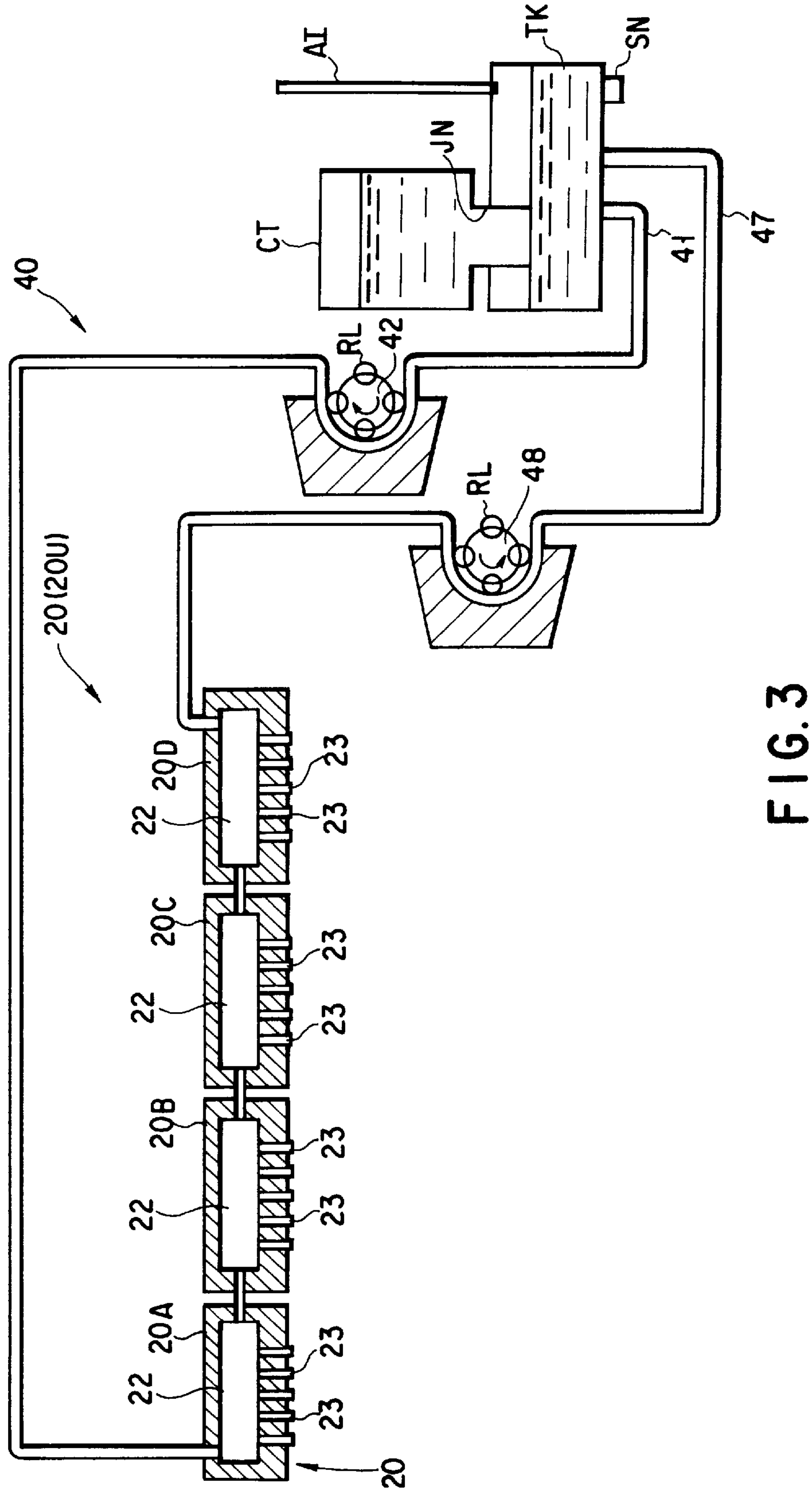
FIG. 3 is a view-showing an ink supply system of the ink-jet printer shown in FIG. 1.
Figure 4:
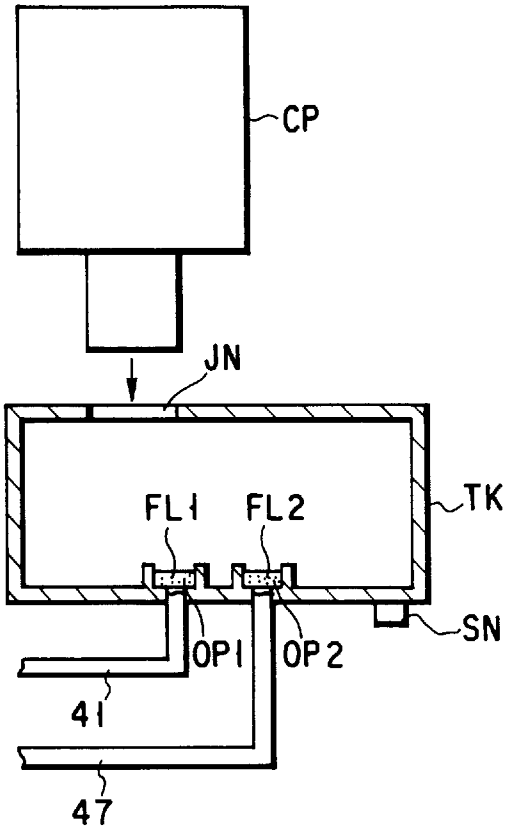
FIG. 4 is a view showing a state where a dummy ink reserve bottle is attached to an ink tank in place of an ink reserve bottle shown in FIG. 3.
Figure 5:
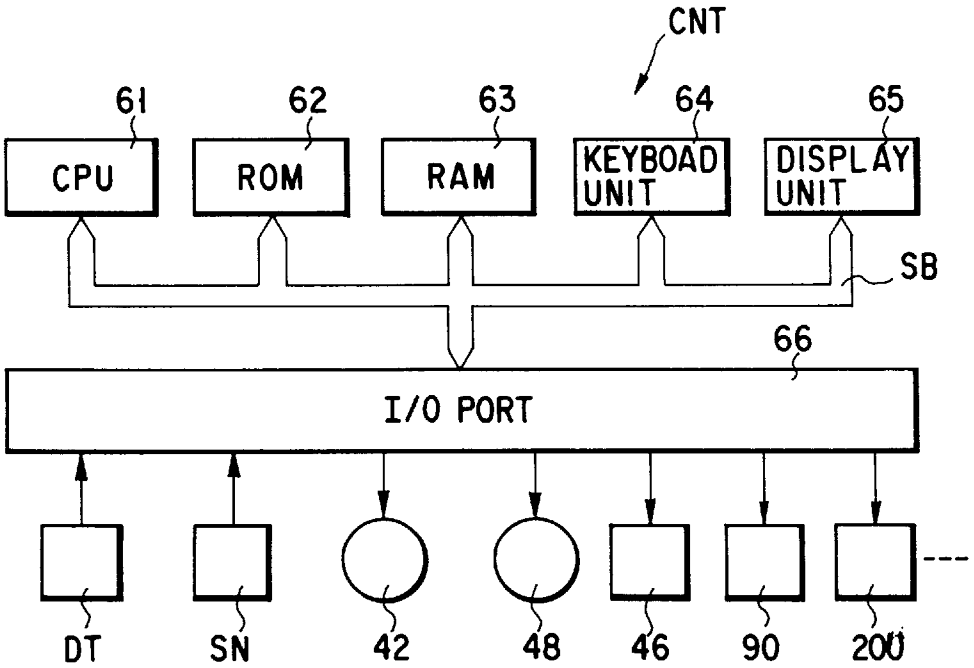
FIG. 5 is a view for explaining the control unit shown in FIG. 1.

The ink supply system SP includes ink supply sections 40 shown in FIG. 3 for nozzle units 20 (C, Y, M, B), respectively. Each ink supply section 40 includes an ink tank TK which is disposed apart from the print head 20U and stores ink, an ink reserve bottle CT for supplying ink to the ink tank TK, an ink supply tube 41 for guiding ink from the ink tank TK to the nozzle unit 20, and an ink return tube for guiding ink from the nozzle unit 20 to the ink tank TK. The ink supply section 40 further includes a supply pump 42 interposed in the ink supply tube 41, a return pump 48 interposed in the ink return tube 47, and an ink amount detection sensor SN attached to the ink tank TK. The supply pump 42 performs an ink supply operation of flowing ink from the ink tank TK to the nozzle unit 20 through the ink supply tube 41. The return pump 48 performs an ink suction operation of flowing excessive ink from the nozzle unit 20 to the ink tank TK through the ink return tube 48. The ink amount detection sensor SN detects an amount of ink stored in the ink tank TK.

Each of the ink supply tube 41 and ink return tube 47 is constituted by an elastic tube of soft synthetic resin. Each of the supply pump 42 and return pump 48 is of a rotary type in which four press rollers RL are provided at a predetermined interval on a circular locus. Each pump has a valve function in which the press rollers RL are stopped to set the elastic tube to a selected one of open and closed states, and are rotated to forcibly flow ink with pressure.

The ink tank TK includes a attachment port JN for supporting ink reserve bottle CT detachably attached thereto, a supply port OP1 connected to the ink supply tube 41, a return port OP2 connected to the ink return tube 47, and an air intake AI formed in communication with the external and internal spaces to take in atmospheric air from the external space to the internal space. The ports OP1 and OP2 are respectively covered with filters FL1 and FL2 for filtering ink to remove impurities contained therein. The ink tank TK is constructed in a closed structure in which ink does not leak to the outside even if atmospheric air is taken in from the air intake AI in the state where the ink reserve bottle CT is attached to the attachment port JN. The attachment port JN can be closed by a sealing member CP to be attached in place of the ink reserve bottle CT. The sealing member CP is attached to the attachment port JN at the stage of delivering the ink-jet printer from a factory. Instead of the ink reserve bottle CT, the sealing member CP prevents dusts from entering into the ink tank TK and also prevents careless attachment of the ink reserve bottle CT. The sealing member CP is constituted, for example, by a dummy ink reserve bottle which is not filled with ink but has a shape identical to the ink reserve bottle CT. Note that the sealing member CP may be a cap having no space for storing ink if its shape is determined to fit at least the attachment port JN.

As shown in FIG. 1, the ink-jet printer further includes an elevation mechanism 90 for automatically adjusting the height of the print head 20U, an ink collection tray 30 for collecting ink ejected from the print head 20U during a non-printing time, and a rotating mechanism 46 for rotating the ink collection tray 30 along the peripheral surface 11 such that the ink collection tray 30 can face the print head 20U. At the time of printing, the elevation mechanism 90 moves the print head 20U to a lower limit position close to the rotary drum 10. At the time of non-printing, the elevation mechanism 90 moves the print head 20U to an upper limit position spaced from the rotary drum, and then to an ink discharge position located between the upper and lower limit positions. At the non-printing time, the rotating mechanism 46 rotates the ink collection tray 30 in a state where the print head 20U is set at the upper limit position, so that the ink collection tray 30 is inserted between the print head 20U and the rotary drum 10. The print head 20U is set to the ink discharge position after insertion of the ink collection tray 30. In this manner, the top ends of the nozzle units 20 (C, Y, M, and B) are set close to the ink collection tray 30 without making contact with the tray 30, so that the ink collection tray 30 can be used in common to collect inks ejected from the nozzle units 20 (C, Y, M, and B). Collected ink is drained as waste ink to a detachable waste ink cassette (not shown) from a drain port of the ink collection tray 30 and is then disposed of.

The control unit CNT includes a CPU 61 for performing a control processing for printing and maintenance, a ROM 62 for storing a control program for the CPU 61, a RAM 63 for temporarily storing data items input into and output from the CPU 61, a display unit 64 for displaying the status of the ink-jet printer, a keyboard unit 65 for entering various mode settings, and an input and output port (or I/O port) 66 serving as an interface for external components of the control unit CNT. The CPU 61 is connected to the ROM 62, RAM 63, display unit 64, keyboard unit 65, and I/O port 66 through a system bus SB. The I/O port 66 is connected to the print head 20U, rotational position detector DT, ink amount detection sensor SN, supply pump 42, return pump 48, elevation mechanism 90, rotating mechanism 46, and other components. The keyboard unit 65 is capable of setting a displacement mode in which all the ink stored in the ink tank TK is discharged from the print head 20U at the non-printing time. The displacement mode is set in a final step of a product inspection carried out prior to delivery of the ink-jet printer. In the case where the displacement mode is set, an ink reserve bottle CT used in a print test is detached from the attachment port JN of the ink tank TK, and a sealing member CP is attached thereto instead.

A displacement mode operation of the ink-jet printer will be described below.

When the displacement mode is set upon operation of the keyboard unit 65, the control unit CNT performs a control necessary for inserting the ink collection tray 30 between the print head 20U and the rotation drum 10 as described above, and ejecting ink from the print head 20U. In each ink supply section 40, the supply pump 42 and return pump 48 are controlled as described below by the control unit CNT. The supply pump 42 is driven to supply ink form the ink tank TK to the nozzle unit 20 of the print head 20U. In this while, the return pump 34 is driven at a lower speed than the supply pump 42 to increase the pressure of the ink pressure chamber 22 of the nozzle unit 20. As a result, all the nozzles 27 of the nozzle unit 20 eject ink toward the ink collection tray 30. When the ink amount detection sensor SN detects that the ink tank TK has become empty, the control unit CNT awaits an elapse of a predetermined period so that no ink remains in the ink supply and ink return tubes 41 and 47, and then stops driving of the supply pump 42 and return pump 48. Specifically, discharging of ink is continued until the ink supply tube 41, the nozzle unit 20, the ink return tube 47 and the ink tank TK become completely empty. Discharged ink is collected by the ink collection tray 30 and is drained as waste ink to the waste ink cassette. After the waste ink cassette is replaced with a new one, the ink-jet printer is packaged and delivered. If the piping structure of the ink return tube 47 is determined such that ink can be naturally drained from the return tube 47 upon decrease of ink in the ink pressure chamber 22 and the ink tank TK, the return pump 48 is kept stopped while the supply pump 42 is driven.

In the ink-jet printer according to the present embodiment, the control unit CNT performs a pump drive processing in the displacement mode, so that pumps 42 and 48 discharge all the ink remaining in the ink tank TK from the print head 20U. The ink-jet printer is transported with the ink tank TK kept empty. Therefore, leakage of ink is not caused even if the ink supply tube 41 or the ink return tube 47 falls off due to impacts and vibrations applied during transportation. Further, since the pump drive processing performed in the displacement mode can be easily attainable, for example, by modifying the existing configuration of the control program stored in the ROM 62, a substantial increase of hardware resources can be avoided in the ink-jet printer.

Moreover, in the ink-jet printer, an ink reserve bottle CT is replaced with an ink sealing member CP in the case where the displacement mode is set. Thus, no ink is supplied to the ink tank TK upon decrease in the amount of ink stored therein. Accordingly, ink can be discharged rapidly while reducing the amount of ink wastefully consumed. In addition, since atmospheric air is introduced into the ink tank TK through the air intake AT, ink can be smoothly discharged by the air pressure acting on the liquid surface of ink.

If a dummy ink reserve bottle filled with no ink and having the same shape as the ink reserve bottle CT used as the sealing member CP, stock of the ink-jet printer can be facilitated and costs can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink-jet printer for printing an image on a printing medium comprising:

an ink tank which stores ink;

a print head which ejects the ink to the printing medium;

a piping member connected between said ink tank and said print head;

a pump mechanism coupled to said piping member and which supplies the ink stored in said ink tank to said print head;

a control unit which controls said print head and said pump mechanism such that the ink is ejected from said print head to print the image; and an ink tray which is movable to face said print head, for collecting ink ejected from said print head to discharge the ink as waste ink; and wherein said control unit includes a mode setting member for setting a displacement mode when said ink-jet printer is displaced to another position, and a processing member for driving said ink tray to face said print head and said pump mechanism to discharge all of the ink stored in said ink tank from said print head to said ink tray, in the displacement mode.

2. An ink-jet printer according to claim 1, wherein:

said piping member includes an ink supply tube connected between said ink tank and said print head;

said pump mechanism includes a supply pump interposed in said ink supply tube, for flowing the ink in said ink supply tube toward said print head; and said processing member is arranged such that said supply pump is driven in the displacement mode.

3. An ink-jet printer according to claim 1, wherein:

said piping member includes an ink supply tube connected between said ink tank and said print head, and an ink return tube connected between said print head and said ink tank;

said pump mechanism includes a supply pump interposed in said ink supply tube for flowing ink in said ink supply tube toward said print head, and a return pump interposed in said ink return tube for flowing ink from said in return tube toward said ink tank; and said processing member is arranged such that said supply pump and said return pump are driven to apply pressure to the ink in said print head in the displacement mode.

4. An ink-jet printer according to claim 3, wherein:

said processing member is arranged to stop said return pump during driving of said supply pump.

5. An ink jet printer according to claim 3, wherein:

said processing member is arranged such that said return pump is driven at a lower speed than said supply pump during driving of said supply pump.

6. An ink-jet printer according to claim 1, wherein:

said ink tank includes an air intake for taking in atmospheric air without leaking ink, and a piping port connected to said piping member; and said ink tank is closed except for said air intake and said piping port.

7. An ink-jet printer according to claim 6, wherein said ink tank further includes:

an attachment port for supporting an ink reserve bottle detachably attached thereto; and a sealing member to be attached to said ink tank in place of said ink reserve bottle, prior to discharging of the ink being performed in the displacement mode.

8. An ink-jet printer according to claim 7, wherein:

said sealing member comprises a dummy ink reserve bottle which is not filled with ink and which has a same shape as the ink reserve bottle.

9. A method of controlling an ink-jet printer which prints an image on a printing medium and comprises an ink tank which stores ink, a print head which ejects the ink to the printing medium, a piping member connected between said ink tank and said print head, a pump mechanism coupled to said piping member to supply the ink stored in said ink tank to said print head, and an ink tray which is movable to face said print head to collect the ink ejected from said print head and to discharge the ink as waste ink, the method comprising:

controlling said print head and said pump mechanism such that the ink is ejected from said print head to print the image;

setting a displacement mode when said ink-jet printer is displaced to another position; and driving said ink tray to face said print head and said pump mechanism to discharge all of ink stored in said ink tank from said print head to said ink tray, in the displacement mode.

* * * * *